(12) United States Patent
Meyer et al.

(10) Patent No.: US 6,626,000 B1
(45) Date of Patent: Sep. 30, 2003

(54) METHOD AND SYSTEM FOR ELECTRONICALLY CONTROLLED HIGH SIDE PRESSURE REGULATION IN A VAPOR COMPRESSION CYCLE

(75) Inventors: John Joseph Meyer, Northville, MI (US); Erik Lundberg, Plymouth, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 10/283,982

(22) Filed: Oct. 30, 2002

(51) Int. Cl.$^7$ .............................. F25B 41/04; F25B 1/00
(52) U.S. Cl. ................... 62/222; 62/DIG. 17; 236/92 B
(58) Field of Search .......................... 62/222, 204, 223, 62/224, DIG. 17; 236/92 B

(56) References Cited

U.S. PATENT DOCUMENTS

| | | | |
|---|---|---|---|
| 3,493,005 A | 2/1970 | Kakegawa | |
| 3,786,651 A | * 1/1974 | Eschbaugh et al. | ........... 62/222 |
| 4,106,691 A | 8/1978 | Nielsen | |
| 5,117,647 A | * 6/1992 | Valbjorn | ...................... 62/222 |
| 5,245,836 A | 9/1993 | Lorentzen et al. | |
| 5,685,160 A | 11/1997 | Abersfelder et al. | |
| 5,732,570 A | * 3/1998 | Tomatsu et al. | ............... 62/527 |
| 5,890,370 A | * 4/1999 | Sakakibara et al. | ........... 62/222 |
| 6,105,380 A | 8/2000 | Yokomachi et al. | |
| 6,134,900 A | * 10/2000 | Nishida et al. | ............... 62/216 |
| 2003/0010833 A1 | * 1/2003 | Hotta et al. | ............... 236/92 B |

* cited by examiner

Primary Examiner—Marc Norman
(74) Attorney, Agent, or Firm—Brinks Hofer Gilson & Lione

(57) ABSTRACT

The invention relates to a refrigeration system for an air conditioner of an automobile, the system having at least a gas cooler, an evaporator, and an expansion valve assembly. The expansion valve assembly is provided with an expansion chamber that is in fluid communication with the gas cooler and the evaporator. A valve defines an opening from the expansion chamber to the outlet conduit and a diaphragm defines another boundary of the expansion chamber. An appendage at least partially located within the expansion chamber. A variable-force mechanism is adapted to cause movement of an appendage coupled thereto, and it is at least partially controlled by an electrical signal. An appendage is moved by the variable-force mechanism, resulting in throttling of the opening.

19 Claims, 3 Drawing Sheets

METHOD AND SYSTEM FOR ELECTRONICALLY CONTROLLED HIGH SIDE PRESSURE REGULATION IN A VAPOR COMPRESSION CYCLE

BACKGROUND OF THE INVENTION

1. Field of the Invention

The invention relates to a valve arrangement for a cooling system that uses a fluid that may be supercritical on the high-pressure side of the system. More particularly, the invention relates to a closed circuit refrigerating system including at least a compressor, a heat rejecting or gas cooling heat exchanger, an expansion valve, and an evaporating heat exchanger; where these elements are connected in series and the expansion valve is at least partially controlled by an electrical signal.

2. Description of Related Art

A conventional vapor compression cycle system for refrigeration, air conditioning, or heat pump purposes includes a compressor, a heat rejecting heat exchanger (gas cooler), an expansion valve, an evaporating heat exchanger (evaporator), and an accumulator. These elements are in fluid communication in a closed flow circuit, in which fluid, such as carbon dioxide ($CO_2$), and other known fluids, is circulated. A supercritical vapor compression cycle system generally operates as follows. The compressor increases the temperature and pressure of the fluid vapor. Vapor flows out of the compressor and into the gas cooler, which then cools the fluid with the fluid giving off heat to a secondary fluid, such as air. The fluid next flows into the expansion valve, which throttles the high-pressure fluid such that the outlet fluid has a lower pressure than the inlet fluid. The low pressure fluid flows into the evaporator, which heats the fluid such that it becomes at least partially vapor. Finally, the fluid flows into the accumulator, which is used as a vapor-liquid separator, and the fluid vapor is finally drawn into the compressor, completing the cycle.

The working fluid is considered to be at a high side pressure when it is located between the outlet of the compressor and the inlet of the expansion valve. Also, the working fluid is considered to be at a low side pressure when it is located between the outlet of the expansion valve and the inlet of the compressor.

Efficiency of a vapor compression cycle is denoted as the coefficient of performance (COP) and is defined as the ratio between the refrigerating capacity and the applied compressor drive power used. In general under typical operating conditions of a supercritical system, the refrigerating capacity obtained at the evaporator rises with increasing high side pressure, and falls with decreasing high side pressure. The COP increases with increasing high side pressure up to a certain point, but then begins to decline as the extra refrigerating effect no longer fully compensates for the extra work of compression. Thus, a maximum COP can be maintained by regulating the high side pressure with the expansion valve.

The prior art expansion valve assemblies control high side pressure with an expansion valve assembly that is mechanically adjusted via a rotatable handle moving a threaded body, which in turn adjusts the position of the top of a spring. Movement of the bottom of the spring controls the size of the opening within the expansion valve and thus controls the high side pressure.

manual valve is not suitable for control of a vapor compression system as it requires human interaction to modify the setting of the valve. Obviously this is not an option for mass-produced vapor compression systems.

In view of the above, it is clear that there exists a need for an expansion valve assembly with a quick and precise response mechanism and with fewer system variables.

It is an object of the present invention to control the valve setting with an electric signal, allowing the vapor compression system to operate without human interaction, thereby making the commercial mass production of such a system feasible.

BRIEF SUMMARY OF THE INVENTION

The present invention provides a refrigeration system and includes a compressor, gas cooler, an evaporator, and an expansion valve assembly. The expansion valve assembly defines an expansion chamber in fluid communication with the gas cooler, by an inlet conduit, and in fluid communication with the evaporator, by an outlet conduit. The inlet conduit contains high side pressure fluid while the outlet conduit contains low side pressure fluid. Within the expansion valve assembly, the valve position defines an opening between the expansion chamber and the outlet conduit. In one preferred embodiment of the invention, the opening is tapered. The expansion valve assembly also includes a diaphragm defining a boundary of the expansion chamber, an appendage at least partially located within the expansion chamber, and a variable-force mechanism located adjacent to the diaphragm. The variable-force mechanism is capable of downward-upward movement, and the applied force is at least partially controlled by an electrical signal correlated to the desired high side pressure.

In one preferred embodiment, a mechanical valve interfaced with a stepper motor operates as a means to achieve the desired outcome. Changes to the valve setting are quick and precise. In another preferred embodiment, the variable-force mechanism is a solenoid. In both embodiments, the appendage is at least partially controlled by the variable-force mechanism, resulting in similar possible downward-upward movement. The applied force is at least partly proportionally related to the Sigh side pressure of the system.

BRIEF DESCRIPTION OF THE DRAWINGS

The above and other objects, features, and advantages of the present invention will be made more apparent from the following description of the preferred embodiments, with reference to the accompanying drawings wherein.

DETAILED DESCRIPTION OF THE INVENTION

Figure 1:
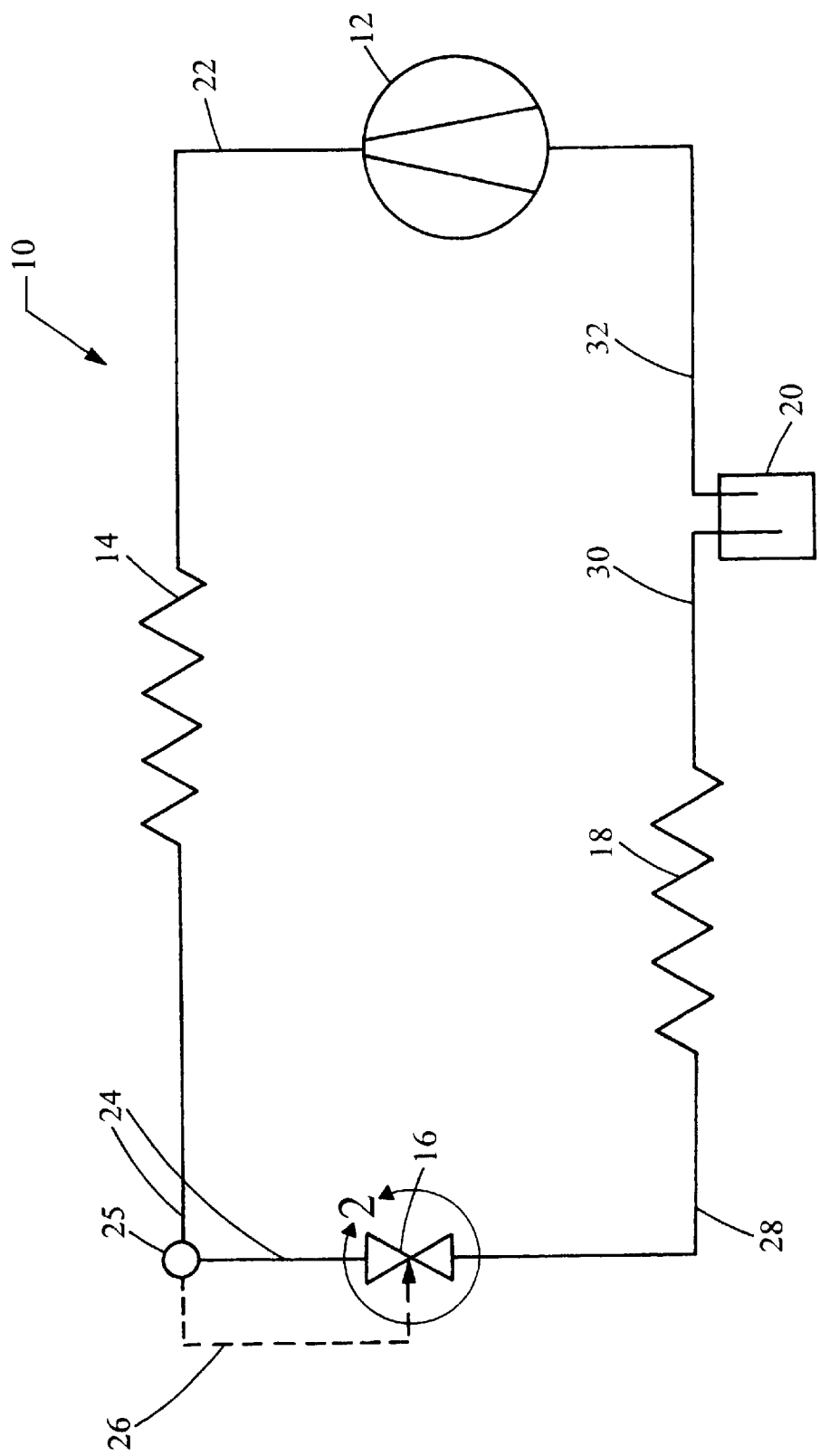
FIG. 1 is a diagram of a vapor compression cycle system for refrigeration, air conditioning, or heat pump purposes, embodying the principles of the present invention.

A vapor compression cycle system 10 is generally shown in FIG. 1. The vapor compression cycle system 10 principally comprises a compressor 12, a heat rejecting heat exchanger (gas cooler 14), an expansion valve 16, an evaporating heat exchanger (evaporator 18), and an accumulator 20. These elements are in fluid communication in a closed flow circuit, in which fluid, such as carbon dioxide ($CO_2$) is circulated.

Generally, the vapor compression cycle system 10 generally operates as follows. The compressor 12, of a conventional and well known construction, increases the temperature and pressure of the fluid vapor. Vapor flows out of the compressor 12 through the compressor gas cooler conduit 22 and into the gas cooler 14 (also of a conventional construction), which then cools the fluid, causing the fluid to give off heat to a secondary fluid, such as air. The fluid next flows through an inlet conduit 24, which has an input sensor 25 measuring the pressure of the fluid into the expansion valve 16. Alternately, it may not be necessary to measure the high-side pressure. Knowing what electric signal corresponds to what high side pressure, and based on a corresponding control strategy, the appropriate signal is sent to the valve to achieve the desired high side pressure. A control strategy 26 is accordingly adapted to control the high side pressure into the expansion valve 16. After the fluid exits the gas cooler, it enters the expansion valve 16, which then throttles the high-pressure fluid such that the fluid in the outlet conduit 28 has a lower pressure than the fluid in the inlet conduit 24. The fluid flows from the expansion valve 16 to the evaporator 18 through the outlet conduit 28. The evaporator 18 heats the fluid such that it becomes vapor. Next, the fluid flows though the evaporator-accumulator conduit 30 into the accumulator 20, which is used as a vapor-liquid separator. The fluid vapor is finally drawn through the accumulator-compressor pipe 32 into the compressor 12, completing the cycle.

As mentioned previously, the working fluid is considered to be at a high side pressure (and therefore generally designated as high pressure fluid 36) when it is located between the outlet of the compressor 12 and the inlet of the expansion valve 16. The working fluid is considered to be at a low side pressure (and therefore generally designated as low pressure fluid 38) when it is located between the outlet of the expansion valve 16 and the inlet of the compressor 12. The vapor compression cycle system 10 operates such that the high side pressure becomes the supercritical pressure of the circulating refrigerant.

Figure 2:
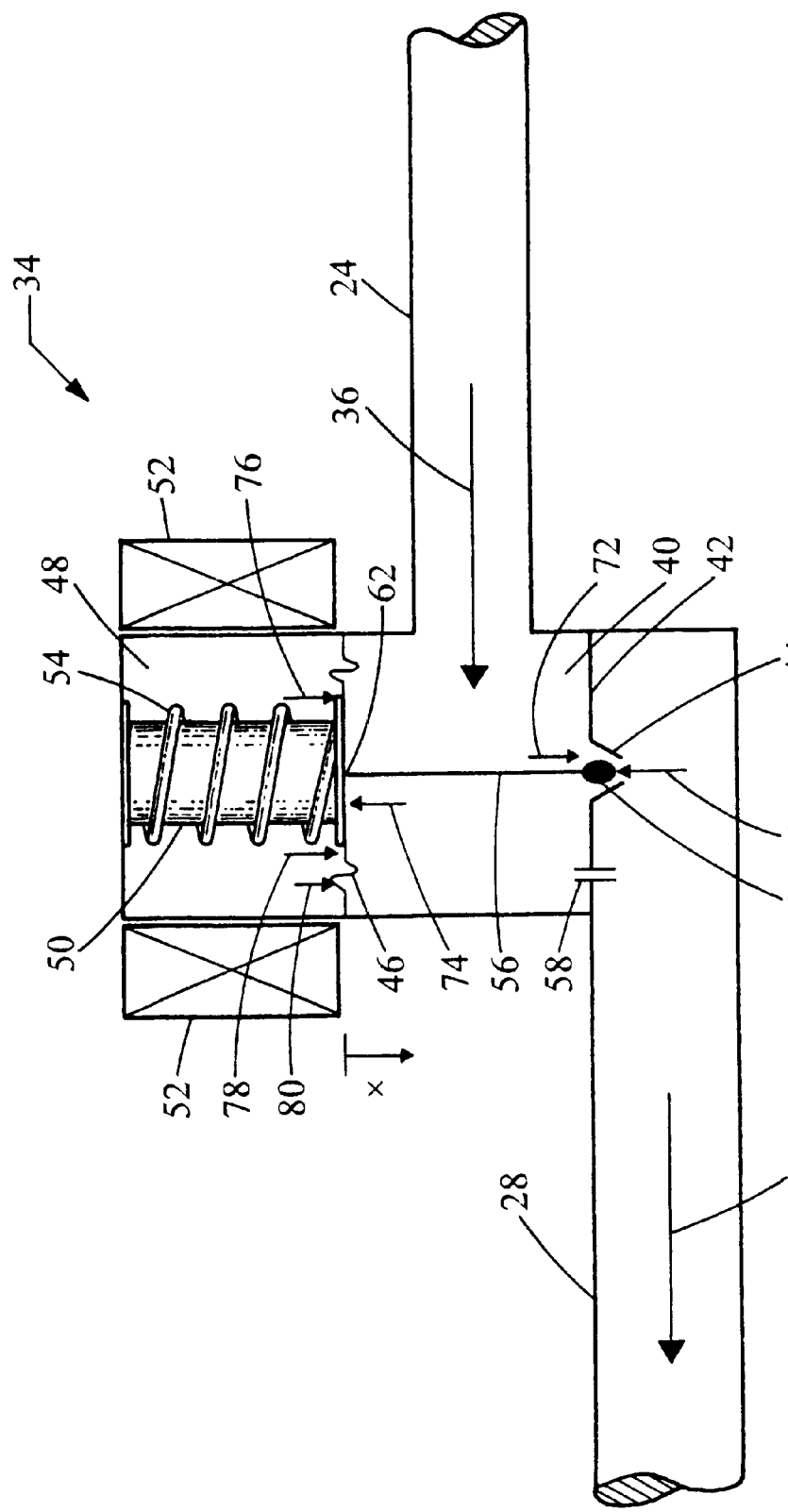
FIG. 2 is an enlarged schematic diagram of an electronically controlled expansion valve assembly, according to the present invention, as generally encircled within Line 2 of FIG. 1, and showing the forces acting on the expansion valve assembly during use.

Referring now to FIG. 2, one embodiment of an electronically controlled expansion valve assembly 34 according to the present invention, generally encircled within Line 2 of FIG. 1, is seen therein. The electronically controlled expansion valve assembly 34 is coupled to the inlet conduit 24, where the high pressure fluid 36 flows at a high side pressure, and the outlet conduit 28, where the low pressure fluid 38 flows at a low side pressure. As described before, the maximum COP can be maintained by regulating the high side pressure of the high pressure fluid 36.

The inlet conduit 24 is connected to a chamber 40 defined within the side walls 41 of the valve assembly 34 such that the condenser 14 and the chamber 40 are in fluid communication. A partition 42 valve defines the lower boundary of the chamber 40 and includes a tapered opening 44 defined therein. The opening 44 communicates the chamber 40 to the outlet conduit 28. The opening 44 is tapered in a preferred embodiment, but it may be provided as a non-tapered or other configuration. The tapered characteristic of the opening 44 allows for a more effective control of the mass flow rate between the chamber 40 and the outlet conduit 28. Defining the upper boundary of the chamber 40 is a diaphragm 46. This diaphragm 46 further separates the chamber 40 from an upper chamber 48. The diaphragm 46 preferably forms a seal between the chamber 40 and the upper chamber 48, such that fluid cannot communicate between the two chambers.

Associated with and located within the upper chamber 48 is a variable-force mechanism 49. In one preferred embodiment, a solenoid core 50, acting as part of the variable force mechanism, is fixedly attached to the diaphragm 46, such that the diaphragm 46 moves in a downward-upward or advanced-retracted motion as the solenoid core 50 moves. Electrical current traveling through a solenoid coil 52 creates a magnetic field that actuates the solenoid core 50. A spring 54 may further be located between the wall 51 of the upper chamber 48 and the diaphragm 46. The net force resulting from the spring 54 and, if present, the force from the solenoid due to the electric signal, result in the proper force balance on the diaphragm 46 to maintain the desired high-side pressure. Accordingly, the signal provided to the expansion valve assembly 34 results in the assembly 34 exhibiting a force balance situation where the desired high side pressure is maintained. The signal therefore correlated to the desired high side pressure.

An appendage 56 is fixedly attached to the diaphragm 46, the solenoid core 50, or both the diaphragm 46 and the solenoid core 50, at an appendage base 62 such that the appendage 56 moves in a downward-upward motion as the solenoid core 50 and/or diaphragm 46 moves. The position of a distal end 60 of the appendage 56 within the opening 44 controls the mass flow rate through the tapered opening 44 by varying the cross-sectional area between the opening 44 and the end 60 of the appendage stem 56. A protrusion may be located on the distal end 60 of the appendage 56 in order to mate with the tapered opening 44.

A preferred embodiment also includes a fixed bypass orifice 58 in the partition 42 and/or a minimum closing clearance between the tapered opening 44 and the of the appendage end 60. The bypass orifice 58 and the minimum closing clearance are designed such that if the desired high side pressure 36 cannot be achieved, the working fluid will still flow through the bypass orifice 58 allowing for continued operation of the system 10, although perhaps at a reduced capacity or efficiency.

FIG. 2 also shows the forces for the illustrated construction acting on the electronically controlled expansion valve assembly 34 during use. Other force balancing construction could also be utilized. The low pressure force 70 on the appendage 56 acts upon the protrusion 60 in an upward direction ("upward" being used in reference to the orientation of the figure and not to mean a required direction referenced to horizontal) such as to create a larger opening between the protrusion 60 or appendage 56 and the tapered opening 44. The low pressure force 70 on the appendage 56 is approximately calculated by multiplying the cross-sectional area of the protrusion 60 ($A_P$) or the appendage stem 56 ($A_S$) by the low side pressure 38 ($P_L$) in the outlet conduit 28. The high pressure force 74 on the diaphragm 46 acts upon the diaphragm 46 in an upward direction. The high pressure force 74 on the diaphragm 46 is approximately calculated by multiplying the cross-sectional area of the diaphragm 46 ($A_D$) by the high side pressure 36 ($P_H$).

The high pressure force 72 on the appendage 56 acts upon the appendage protrusion or the appendage stem in a downward direction (such as to tend to create a smaller opening between the appendage protrusion or stem and the tapered opening 44). The high pressure force 72 on the appendage 56 is approximately calculated by multiplying the cross-sectional area of the appendage protrusion ($A_P$) minus the area of the stem ($A_S$) by the high side pressure 36 ($P_H$) in the inlet conduit 24. A spring force 76 acts upon the diaphragm 46 in either a downward or upward direction, and the spring force 76 is approximately calculated by multiplying the spring constant (k) by the distance that the spring is compressed or extended (x). A solenoid force 78 ($F_S$) may act upon the diaphragm 46 in either a downward or upward direction, and the solenoid force 78 is preferably controlled by an electrical current running through the solenoid core 50. The chamber pressure force 80 acts upon the diaphragm 46 in a downward direction, and the chamber pressure force 80 is approximately calculated by multiplying the cross-sectional area of the diaphragm 46 ($A_d$) by the upper chamber pressure ($P_C$).

Thus, the force balance equation for the electronically controlled expansion valve assembly 34 is approximated as follows:

$$P_L*A_S+P_H*A_D=P_C*A_D+P_D*(A_P-A_S)-kx+F_S+C_{Preset}$$

If $A_D \gg A_P$, then $$P_H*A_D=P_C*A_D-kx+F_S+C_{Preset}$$

Due to small changes in the movement of the diaphragm 46, the spring force 76 remains relatively constant compared to the solenoid force 78. Thus, $A_D$, $P_C$, and kx are relatively constant, and:

$$P_H F_S$$

Therefore, in the electronically controlled expansion valve assembly 34 embodied in the present invention, the high side pressure 36 can be substantially controlled by the solenoid force 78.

Figure 3:
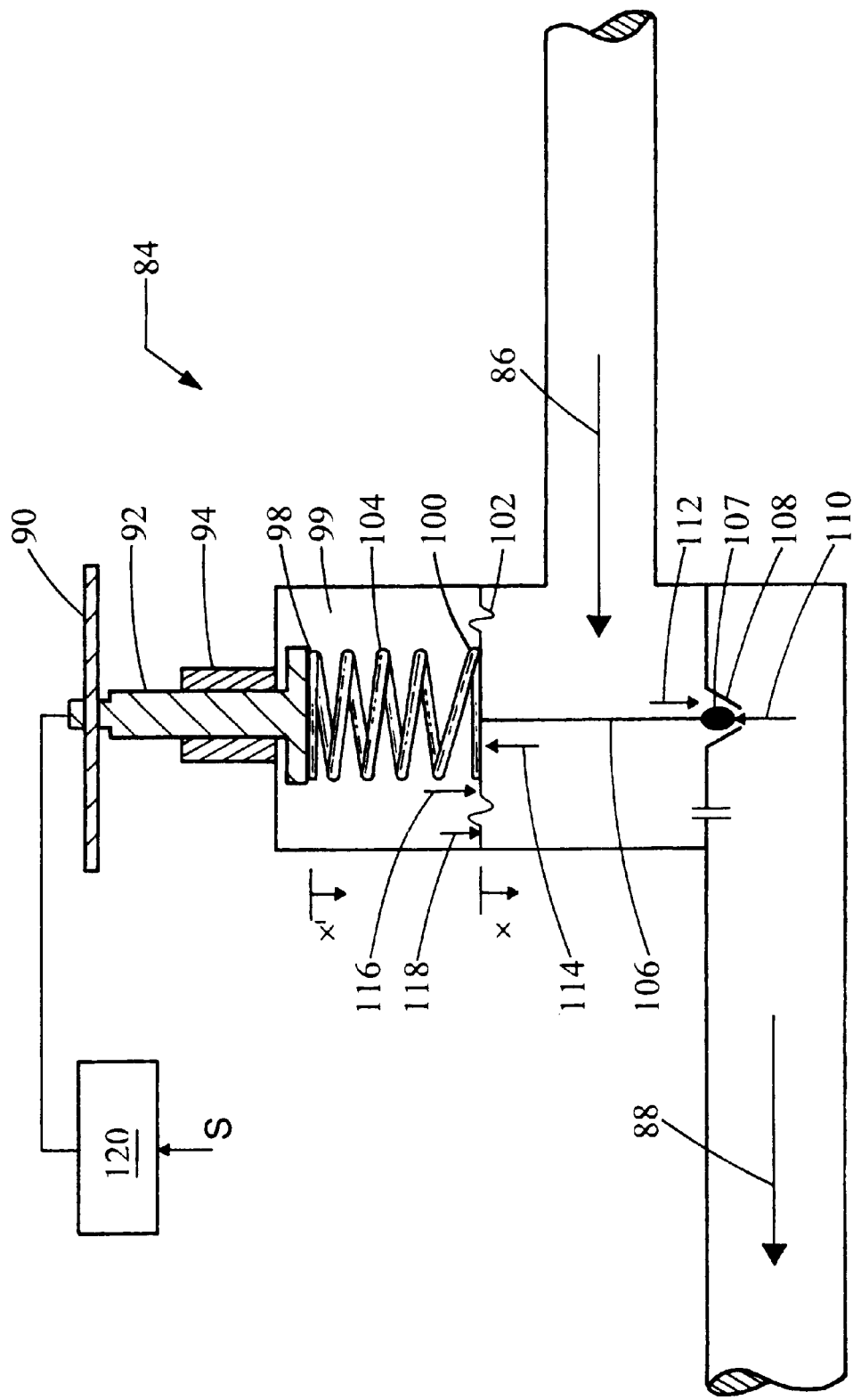
FIG. 3 is a schematic illustration of a mechanical setting, expansion valve assembly coupled to a stepper motor and showing the forces acting on the expansion valve assembly during use.

FIG. 3 is a schematic sketch of another embodiment incorporating the principles of this invention. The mechanical expansion valve assembly 84 controls the high side pressure 86 by adjusting the position of the spring top 98. The adjusting handle 90 turns the threaded cylinder 92, which interacts with the threaded opening 94 and moves upward or downward. The spring top 98 is coupled with the threaded cylinder 92 such that the spring top 98 moves upward or downward in unison with the threaded cylinder 92. As the spring top 98 moves upward or downward, the spring body 104 will compress and/or the spring bottom 100 will move upward or downward. The spring bottom 100 is coupled with the diaphragm 102, and the appendage 106 is coupled with the diaphragm 102 such that the appendage 106 moves upward or downward as the spring bottom 100 moves upward or downward. The distance between the end 107 of the appendage 106 and the opening 108, which may be tapered, controls the high side pressure 36.

In order to adjust the handle 90 and accordingly the force balance setting of the assembly 84, the handle 90 is coupled to, for example, a stepper motor 120. The stepper motor 120 receives an electric signal s via the control strategy and, based on the signal, changes the position of the end 107 of the appendage 106 thereby creating the desired high side pressure.

FIG. 3 also shows the forces acting on the mechanical setting expansion valve assembly 84 during use. The low pressure force on the appendage 110 acts upon the appendage end 107 in an upward direction. The low pressure force on the appendage 110 is approximately calculated by multiplying the cross-sectional area of the appendage protrusion 107 ($A_P$) by the low side pressure 88 ($P_L$). The high pressure force on the diaphragm 114 acts upon the diaphragm 102 in an upward direction, and the high pressure force on the diaphragm 114 is approximately calculated by multiplying the cross-sectional area of the diaphragm 102 ($A_D$) by the high side pressure 86 ($P_H$).

The high pressure force on the appendage 112 acts upon the appendage end 107 in a downward direction. The high pressure force on the appendage 112 is approximately calculated by multiplying the cross-sectional area of the appendage end 107 ($A_P$) by the high side pressure 86 ($P_H$). The spring force 116 may act upon the diaphragm 102 in either a downward or upward direction, and the spring force 116 is approximately calculated by multiplying the spring constant (k) by the distance that the spring is compressed or extended (x-x'). The chamber pressure force on the diaphragm 118 acts upon the diaphragm 102 in a downward direction, and the chamber pressure force on the diaphragm 118 is approximately calculated by multiplying the cross-sectional area of the diaphragm 102 ($A_D$) by the upper chamber 99 pressure ($P_C$).

Thus, the force balance equation for the mechanical setting expansion valve assembly 84 is as follows:

$$P_L*A_S+P_H*A_D=P_C*A_D+P_D*A_S-k(x-x')+C_{Preset}$$

If $A_D \gg A_S$, then $$P_H*A_D=P_C A_D 31\ k(x-x')+C_{Preset}$$

The values for $A_D$ and $P_C$ are relatively constant, thus:

$$P_H(x-x')$$

One advantage of an electronically controlled expansion valve assembly according to this invention, is that the high-side pressure is directly proportional to or a function of the signal being sent to the valve assembly. Thus, if system parameters change (compressor speed, blower speed, etc.) the signal to the valve will not have to change, and the valve will be self-adjusting. If the system change results in higher than desired pressure, the valve will open to let more flow through until the desired pressure is achieved. If the system change results in a decrease in pressure, the valve will close, restricting flow, until the desired pressure is achieved. In either case, a new electronic signal will not have to be sent to the valve, the corrections are a result of the internal force balance. This will make the control strategy much simpler compared to a typical electronic expansion valve where the actual opening is set and controlled in order to control pressure.

The foregoing discussion discloses and describes two preferred embodiments of the invention. One skilled in the art will readily recognize from such discussion, and from the accompanying drawings and claims, that changes and modifications can be made to the invention without departing from the scope of the invention as defined in the following claims. The invention has been described in an illustrative manner, and it is to be understood that the terminology which has been used is intended to be in the nature of words of description rather than of limitation.

We claim:

1. A method for operating a refrigeration system for an air conditioner for an automobile, the method comprising:
    producing a desired pressure on the high pressure side of the refrigeration system;
    said desired pressure being produced by producing an electrical signal in the system;
    establishing a force balanced condition in a valve assembly as a result of the electrical signal and corresponding to the desired pressure;

enabling movement of an appendage relative to an opening in response to the force balanced condition;

wherein location of said appendage relative to said opening controls the flow of fluid through said opening and regulates the high side pressure to said desired pressure.

2. A method according to claim 1, further comprising the steps of inputting a desired pressure into a control strategy, said control strategy outputting said electrical signal to said refrigeration system.

3. A refrigeration system comprising:

a gas cooler; an evaporator; an expansion valve assembly in fluid communication with said gas cooler by an inlet conduit and in fluid communication with said evaporator by a outlet conduit;

said expansion valve assembly including a portion defining an opening between said expansion chamber and said outlet conduit, a diaphragm defining a boundary of said expansion chamber, an appendage coupled to said diaphragm and at least partially located within said expansion chamber and adapted for movement between positions relative to said opening, a variable-force mechanism at least partially controlled by an electrical signal to establish a force balanced condition in said valve assembly and adapted for movement in response to said electric signal;

wherein said movement of said appendage relative to said opening is at least partially controlled by said movement of said variable-force mechanism.

4. A refrigeration system claimed in claim 3 wherein said appendage position relative to said opening is at least substantially proportional to the fluid pressure in said inlet conduit.

5. A refrigeration system claimed in claim 3 further comprising a sensor measuring fluid pressure in said inlet conduit, and said appendage being moved in response to said measurement.

6. A refrigeration system claimed in claim 3 wherein a fixed orifice exists between said expansion chamber and said outlet conduit.

7. A refrigeration system claimed in claim 3 wherein said opening and said appendage have a minimum closing clearance between said expansion chamber and said outlet conduit.

8. A refrigeration system claimed in claim 3 wherein a protrusion is located on said appendage.

9. A refrigeration system claimed in claim 3 wherein a generally spherical protrusion is located on said appendage.

10. A refrigeration system claimed in claim 3 comprising a spring located between said diaphragm and said wall defining said boundary of said expansion valve assembly.

11. A refrigeration system claimed in claim 3 wherein said variable-force mechanism includes a solenoid responsive to the electrical signal.

12. A refrigeration system claimed in claim 3 wherein said variable-force mechanism includes a stepper motor responsive to the electrical signal.

13. A refrigeration system for an air conditioner for an automobile comprising:

a gas cooler, an evaporator, an expansion valve assembly in fluid communication with said gas cooler by an inlet conduit and in fluid communication with said evaporator by an outlet conduit;

a valve defining an opening between said expansion chamber and said outlet conduit;

a diaphragm defining a boundary of said expansion chamber;

an appendage at least partially located within said expansion chamber and being moveable in relation to said opening;

a variable-force mechanism at least partially controlled by an electrical signal to establish a force balanced condition and coupled to said appendage;

wherein said variable-force mechanism is adapted to move in response to said electric signal and cause movement of said appendage relative to said opening, location of said appendage relative to said opening being at least partially proportional to the fluid pressure in said inlet conduit.

14. A refrigeration system claimed in claim 13 further comprising a sensor sensing fluid pressure in said inlet conduit and said appendage being moved in response to said measurement.

15. A refrigeration system claimed in claim 13 wherein said valve defines a fixed orifice between said expansion chamber and said outlet conduit.

16. A refrigeration system claimed in claim 13 wherein said opening and said appendage have a minimum closing clearance between said expansion chamber and said outlet conduit.

17. A refrigeration system claimed in claim 13 wherein a protrusion is located on and end of said appendage.

18. A refrigeration system claimed in claim 13 comprising a spring located between said diaphragm and said wall defining said boundary of said expansion valve assembly.

19. A refrigeration system claimed in claim 13 wherein said variable-force mechanism is a solenoid.

* * * * *

UNITED STATES PATENT AND TRADEMARK OFFICE
CERTIFICATE OF CORRECTION

PATENT NO.    : 6,626,000 B1
DATED         : September 30, 2003
INVENTOR(S)   : John J. Meyer et al.

It is certified that error appears in the above-identified patent and that said Letters Patent is hereby corrected as shown below:

Column 8,
Line 44, after "located on" delete "and" and substitute -- an -- in its place.

Signed and Sealed this

Tenth Day of February, 2004

JON W. DUDAS
*Acting Director of the United States Patent and Trademark Office*